United States Patent
Sanns, Jr.

(10) Patent No.: US 7,550,741 B2
(45) Date of Patent: Jun. 23, 2009

(54) INERTIAL ELECTROSTATIC CONFINEMENT FUSION

(76) Inventor: Frank Sanns, Jr., 733 Robin Dr., Pittsburgh, PA (US) 15220

( * ) Notice: Subject to any disclaimer, the term of this patent is extended or adjusted under 35 U.S.C. 154(b) by 335 days.

(21) Appl. No.: 11/550,579

(22) Filed: Oct. 18, 2006

(65) Prior Publication Data
US 2008/0142725 A1    Jun. 19, 2008

(51) Int. Cl.
*G21B 1/00* (2006.01)
*G21B 1/02* (2006.01)

(52) U.S. Cl. .............. 250/423 R; 250/423 F; 250/397; 250/398; 376/106; 376/107

(58) Field of Classification Search .......... 376/106, 376/107; 250/251
See application file for complete search history.

(56) References Cited

U.S. PATENT DOCUMENTS

| | | | |
|---|---|---|---|
| 3,258,402 A | 6/1966 | Farnsworth | |
| 3,386,883 A | 6/1968 | Farnsworth | |
| 3,530,497 A | 9/1970 | Hirsch et al. | |
| 3,533,910 A | 10/1970 | Hirsch | |
| 3,718,836 A | 2/1973 | Bain et al. | |
| 3,740,554 A | 6/1973 | Morgan, Jr. | |
| 4,007,392 A | 2/1977 | Valfells et al. | |
| 4,202,725 A | 5/1980 | Jarnagin | |
| 4,659,899 A | 4/1987 | Welkie et al. | |
| 4,714,834 A | 12/1987 | Shubaly | |
| 4,752,667 A | 6/1988 | Blanchard et al. | |
| 4,826,646 A | 5/1989 | Bussard | |
| 5,034,183 A | 7/1991 | Blewett | |
| 5,160,695 A | 11/1992 | Bussard | |
| 5,517,083 A | 5/1996 | Whitlock | |

OTHER PUBLICATIONS

Yoshikawa et al., Measurement of strongly localized potential well profiles in an inertial electrostatic fusion neutron source; Nuclear Fusion, vol. 41, No. 6; pp. 717-720.

Ohnishi et al., Correlation Between Potential Well Structure And Neutron Production In Inertial Electrostatic Confinement Fusion; Nuclear Fusion, vol. 37, No. 5 (1997) pp. 611-619.

Matsuura et al., Ion distribution function and radial profile of neutron production rate in spherical inertial electrostatic confinement plasmas; Nuclear Fusion, vol. 40, No. 12, pp. 1951-1954; Copyright 2000, IAEA, Vienna.

Stanley Humphries Jr., Self Magnetic Insulation Of Pulsed Ion Diodes; Plasma Physics, vol. 19, pp. 399-406, Pergamon Press, 1977, printed in Northern Ireland.

(Continued)

*Primary Examiner*—David A. Vanore
(74) *Attorney, Agent, or Firm*—McNees Wallace & Nurick, LLC

(57) ABSTRACT

A device for accelerating ions between a potential towards a central point in space is disclosed. The device can be used to accelerate ions along a collision path with other accelerated ions or other present particles resulting in a nuclear fusion reaction. The device improves upon the prior art by using a plasma as one of the electrodes forming the potential.

17 Claims, 3 Drawing Sheets

Improved IECP Device

OTHER PUBLICATIONS

T J Dolan, Magnetic electrostatic plasma confinement; Plasma Phys. Control. Fusion 36 (1994) 1539-1593. Printed in the UK.

Thorson et al., Convergence, electrostatic potential, and density measurements in a spherically convergent ion focus; Phys. Plasmas 4 (1), Jan. 1977; Copyright 1997 American Institute of Physics.

Thornson et al., Fusion Reactivity Characterization Of A Spherically Convergent Ion Focus; Nuclear Fusion, vol. 38, No. 4 (1998) pp. 495-507.

S. Krishan, Non-Linear Dynamics Of Non-Neutral Plasmas; Plasma Physics and Controlled Fusion, vol. 32, No. 13 pp. 1209-1219, 1990 Printed in Great Britain; IOP Publishing Ltd. and Pergamon Press.

Gugg et al., Nonlinear Standing And Rotating Waves On The Sphere; Journal of Differential Equations 166, pp. 402-442 (2000) by Academic Press.

Barnes et al., Alternate Fusion: Continuous Inertial Confinement; Plasma Phys. Control. Fusion 35 (1993) pp. 929-940, Printed in the UK; IOP Publishing Ltd.

Figure 2. Improved IECP Device ance with the invention, an IECF apparatus is provided that eliminates the inner wire grid entirely. The proposed concept eliminates the inner wire grid entirely by forming a plasma as the inner electrode. This plasma inner electrode has no physical structure to melt or block ions. In
INERTIAL ELECTROSTATIC CONFINEMENT FUSION

FIELD OF THE INVENTION

This invention relates to an apparatus and method for accelerating charged ions towards a central focal point by a charge potential created by concentric electrodes. Inertial Electrostatic Concentric Fusion (IECF) employs two different size concentric spherical grids that have a voltage potential difference between them to accelerate ions from the space between the grids towards the inner grid and toward the center point of the device.

BACKGROUND OF THE INVENTION

A conventional IECF device 10 is shown at FIG. 1. An electrical potential is created by placing a small inner grid 20 within a larger, concentric outer grid 30, and supplying a high voltage feed 50 to the inner grid. Usually, the inner grid 20 is the negative electrode, at high voltage, and the outer grid 30 is the positive electrode, at ground, to protect operational personnel from the high voltage. The outer grid 30 may be a spherical outer chamber. When the outer grid 30 is a solid surface sphere, it may be also act as a vacuum chamber. If the outer grid 30 is a non-solid surface sphere, the outer grid 30 is contained in a separate vacuum chamber (not shown).

The inner grid 20 is usually in the form of a spherical wire grid. The inner grid 20 is typically supported by a ceramic insulating stalk 40. The ceramic stalk 40 is a conduit for a high voltage feed 50 to pass through and be connected to the inner grid 20.

A vacuum is formed within the outer grid 30 by a vacuum system 60. The vacuum may be formed within a separate vacuum chamber if provided. The outer grid 30 or vacuum chamber is filled with a fill gas from a fill gas source 70.

An IECF device is normally operated at a reduced pressure on the order of 10-30 microns absolute (0.01-0.03 torr) with a fill gas that is typically, but not limited to, deuterium, tritium or deuterium/tritium mix. The fill gas provides a source of ions, which are formed in situ when the potential is applied, so that any gas capable of ionization can be used. Ions can also be introduced into the device from an ion gun, particle beam or any other known ion source that may inject the ions into a neutrally charged fill gas.

When the apparatus is placed under vacuum and a high voltage feed 50 is applied to the inner grid 20, ions are formed from the fill gas by the flow of electrons between the outer grid 30 and the inner grid 20. A voltage of 10 KV to 1 MV DC may be applied to the inner grid 20, with 20 KV to 200 KV DC more commonly applied. An electrical potential is thus created between the outer grid 30 and the inner grid 20. Fill gas ions are then accelerated from the space approximately between the outer grid 30 and the inner grid 20 towards the inner grid 20. These ions either pass through the inner grid 20 towards the center of the device or impact the wire structure of the inner grid 20.

The inner grid 20 is the subject of much study since it must be designed to provide a uniform accelerating potential for ions but must also be designed to minimize the obstruction for ions to pass through to reach the center of the device. The inner grid 30, at high voltage, provides the potential through which positive ions such as deuterium ions are accelerated toward the center of the IECF device.

The inner grid 20 is usually in the form of a spherical wire grid structure, which has a surface that is substantially empty space between the wires. This empty space allows ions to pass through towards the center of the device, allowing those ions to collide with other ions that are similarly being accelerated towards the device center or with other particles simply present in the path of the accelerated ions. In this manner, ions from the space between the electrodes are accelerated toward this inner grid 20. These accelerated ions gain enough energy, typically more than 20 KeV under the proper amount of potential, and fuse with other ions, neutral atoms and/or molecules, releasing nuclear fusion energy.

Two limitations are inherent to a wire designed inner grid. The first limitation is that the maximum number of ions do not reach the center of the apparatus because a certain amount of ions impact upon the wire of the inner grid structure and terminate upon the surface of the wire. These ions cannot contribute to collisions. The second limitation is that the ions that impact the wire of the inner grid cause damage to the grid and affect the temperature at which the device is operated. The impacting ions transfer their kinetic energy to the wire material and increase the temperature of the wire material.

The first limitation can be minimized by maximizing the openings of the inner wire grid to allow ions to pass through. However, maximizing the openings decreases the uniformity of the potential field created by the grid. For best accelerating performance, a solid inner sphere would provide for the most uniform acceleration, but this configuration would not allow any ions to pass through to the center of the device. To maximize the amount of ions reaching the center of the device, the amount of wire material forming the inner wire grid may be reduced, but this decreases the uniformity of the field close to the inner grid.

Thus, with a conventional open wire inner grid, there is always a trade-off between uniformity of acceleration potential and the amount of ions reaching the center of the device. A compromise that is normally used is an inner grid structure formed of an open wire inner grid of 0.5 to 3 inch diameter wire rings. These rings, usually 4 or more, are spot welded to each other to form a sphere of mostly open space. A wire diameter of 0.020 inch is frequently used to form the wire rings.

From a perspective outside the surface of the inner wire grid, the grid electrically looks like a spherical point charge to accelerating ions and is a good alternative to a solid inner spherical electrode. However, a portion of the ions will still be blocked from passing through the inner grid to the center of the device since some portion of the ions will still impinge upon the wires forming the inner wire.

The second problem present with any wire inner grid of any geometry is that ions impinging upon the grid cause heating of the grid, even destruction of the wire grid from melting under certain operating conditions. The ions accelerating toward the inner grid have a great amount of kinetic energy from the accelerating potential. This kinetic energy is dissipated as heat when ions impact the inner wire grid. Impacting ions cause the wire to heat and glow from incandescence, and melt the wire grid at all but the lowest operating power. The use of tungsten wire or the like can increase operating power levels, but undesirable melting of the inner grid wire will still occur at higher power levels of approximately greater than 2 kW.

SUMMARY OF THE INVENTION

In accordance with the invention, an IECF apparatus is provided that eliminates the inner wire grid entirely. The proposed concept eliminates the inner wire grid entirely by forming a plasma as the inner electrode. This plasma inner electrode has no physical structure to melt or block ions. In fact, the accelerated ions that normally would destroy a metal wire inner grid will enhance the plasma by transferring some of their kinetic energy to ions and neutral species during collisions with those particles.

The plasma appears as a point potential to ions in the space between the plasma and the outer electrode, similar to an inner wire grid electrode, to accelerate ions towards a central point of the apparatus. During operation, this plasma, which can produces energy in the visual light wavelength spectrum, as well as a glow that may result form heating of structural members, is referred to as "The Pillar of Fire."

The invention thus overcomes the problems of the prior art by providing for an inertial electrostatic confinement fusion (IECF) apparatus that includes an inner plasma electrode surrounded by an outer electrode, a fill gas source supplying an ionizable gas between the inner plasma electrode and the outer electrode, and a means for creating a potential between the inner plasma electrode and the outer electrode that accelerates ions towards the inner electrode The improved IECF apparatus can form the inner plasma electrode by known ion excitation methods. These excitation methods include, but are not limited to, gas excitation by applying a high voltage potential or by radio frequency (RF) energy.

The improved IECF apparatus is not limited to forming ions in situ from the fill gas, but can also accelerate ions introduced into the vacuum environment. Ions may be introduced through the stalk or stalks that are a part of the inner electrode.

The invention also provides for an ion acceleration apparatus which comprises an inner plasma electrode and an outer electrode surrounding the inner plasma electrode, a gas source supplying an ionizable gas between the inner plasma electrode and the outer electrode, and a means for creating a potential between the inner plasma electrode and the outer electrode to accelerate ions towards the inner plasma electrode. The inner plasma electrode is formed by a high voltage potential or RF gas excitation.

The improved ion acceleration apparatus can form the inner plasma electrode by known ion excitation methods. These excitation methods include, but are not limited to, gas excitation by applying a high voltage potential or by focusing RF energy.

The improved ion acceleration apparatus is not limited to forming ions in situ from the fill gas, but can also accelerate ions introduced to the vacuum environment.

The invention further provides a method of producing a nuclear reaction comprising creating a plasma inner electrode, surrounding the plasma inner electrode with an outer electrode, providing an ion source between the plasma inner electrode and the outer electrode, and forming a potential between the plasma inner electrode and the outer electrode to accelerate ions from the ion source towards the plasma to produce collisions of ions resulting in a nuclear fusion reaction. The ion source can be a fill gas that is ionized by the potential created between the inner plasma electrode and the outer electrode. The plasma is created by a high voltage potential or by a radio frequency gas excitation. It should be appreciated that other gas excitation methods capable of forming ions can be used to form the inner plasma electrode.

The method for producing a nuclear reaction is not limited to forming ions in situ from the fill gas, but can also accelerate ions affected by the potential, such as ions introduced into the vacuum through the stalks, or by an ion gun.

The invention also provides for a method of accelerating ions comprising creating a plasma electrode, surrounding the plasma electrode with an outer electrode, providing an ion source between the plasma and the outer electrode, and forming a potential between the plasma electrode and the outer electrode to accelerate ions from the ion source towards the plasma. The ion source can be a fill gas that is ionized by the potential created between the inner plasma electrode and the outer electrode. The plasma is created by a potential such as by a formed by high voltage or by a radio frequency gas excitation. It should be appreciated that other gas excitation methods can be used to form the inner plasma electrode.

The method for accelerating ions is not limited to forming ions in situ from the fill gas, but can also accelerate ions introduced to the vacuum environment.

Further aspects of the method and apparatus are disclosed herein. The features as discussed above as well as other features and advantages of the present invention will be appreciated and understood by those skilled in the art from the following detailed description and drawings.

DETAILED DESCRIPTION OF THE INVENTION

Reference will now be made in detail to the present embodiment of the invention, an example of which is illustrated in the accompanying drawings. Wherever possible, the same reference numbers will be used throughout the drawings to refer to the same or like parts.

Figure 1:
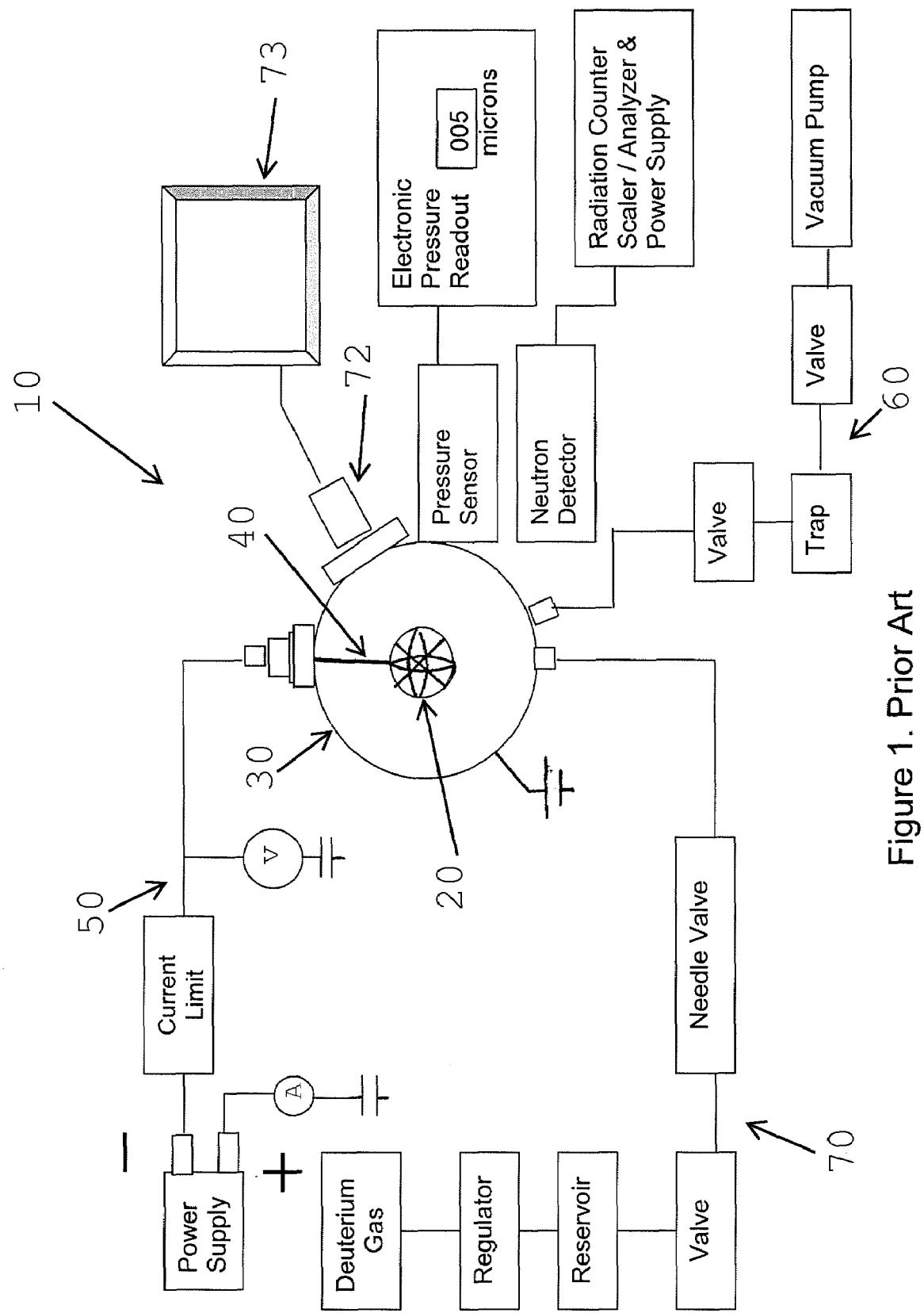
FIG. 1 is a schematic of a conventional IECF apparatus.
Figure 2:
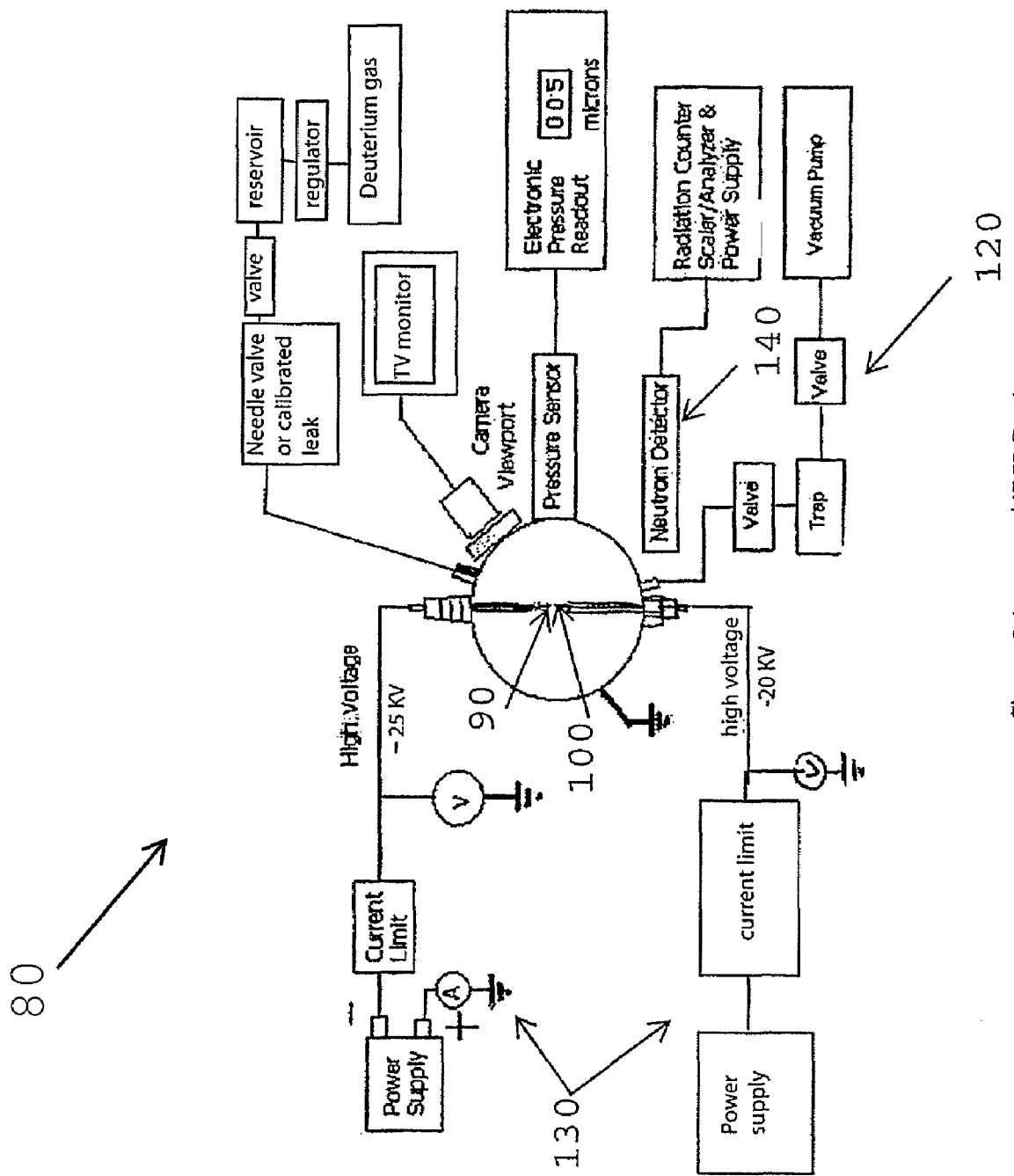
FIG. 2 is a schematic of the improved IECF apparatus containing the electrode configuration and showing the direction of ion travel when in operation.
Figure 3:
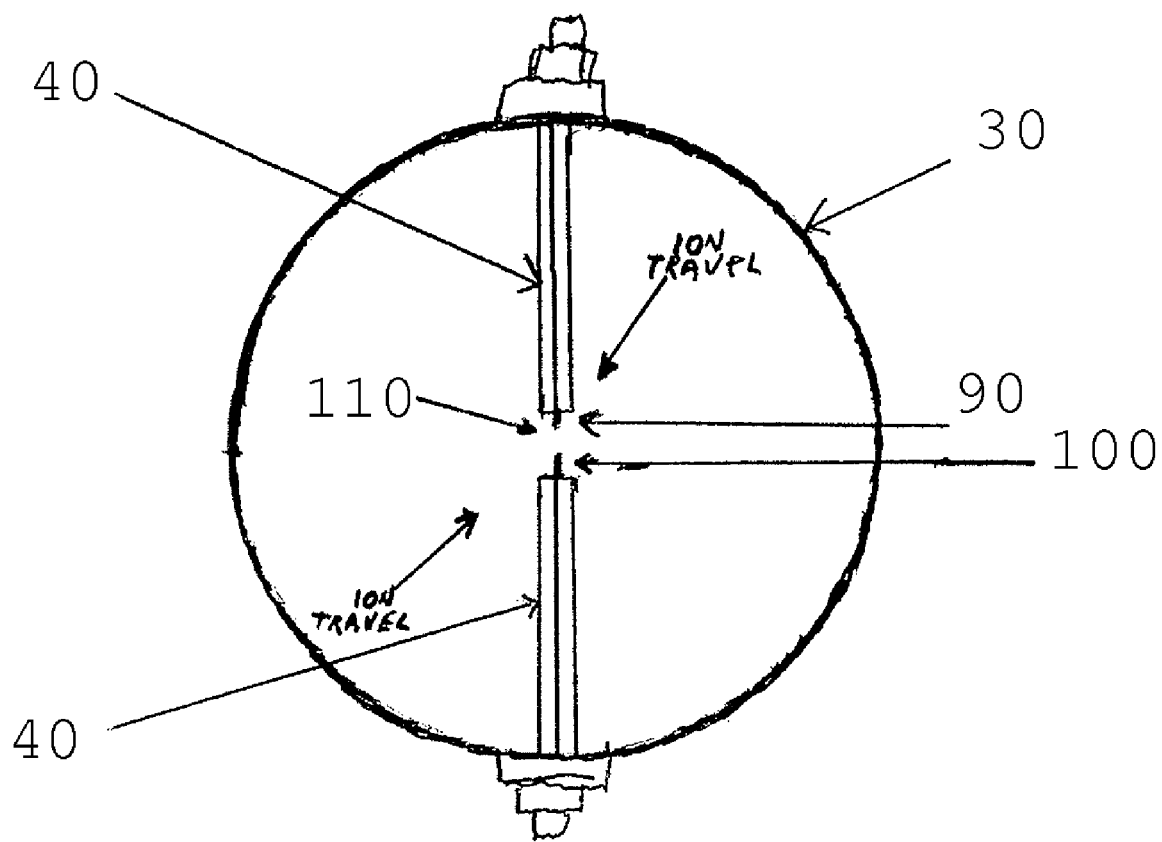
FIG. 3 is an enlarged schematic of the electrode configuration.

In accordance with a preferred embodiment of the present invention, the improved IECF apparatus 80 is shown at FIG. 2, with an enlarged view of the electrode configuration shown at FIG. 3. The IECF apparatus 80 has a top electrode 90 and a bottom electrode 100 that are separated by a gap 110. During operation, a plasma discharge is formed between the top electrode 90 and the bottom electrode 100. This plasma discharge forms the inner electrode of the IECF apparatus. The top electrode 90 and the bottom electrode 100 are contained within an outer electrode 30.

In this embodiment, the outer electrode 30 is a non-solid surface sphere formed of bands of conductive metal, so the outer electrode 30 must be contained in a vacuum chamber (not shown).

To operate the apparatus, an ionizable fill gas is supplied to the vacuum chamber. A first high voltage from a power supply is supplied to the top electrode 90 and a second high voltage is supplied to the bottom electrode 100. The first and second high voltages are slightly different, for example −25 KV and −20 KV, which creates a potential discharge in the gap that forms a plasma of the ionized fill gas in the vicinity of the gap between the electrodes. The formed plasma is the inner electrode for the IECF apparatus.

The opposing electrodes have an adjustable gap 110 between them that can be adjusted from a fraction of an inch to several inches. The electrodes were at a separation of 0.25 inches for these experiments, however, it is understood that smaller or larger gaps could be used depending upon the selected operational parameters including voltage, fill gas composition, fill gas pressure, electrode material and geometry, and focusing schemes.

The apparatus further comprises an outer electrode 30 formed of aluminum or other conductive material. In this embodiment, the outer electrode is formed of circular bands of aluminum formed into a spherical structure. The inner and outer electrodes are contained within a vacuum chamber (not shown). The vacuum chamber is supplied with a ionizable fill gas by a fill gas supply source. The fill gas can be deuterium, which is ionized by both the electrical potential created between the upper and lower electrodes that form the inner electrode, and by the potential created between the inner and outer electrodes. The potential between the upper and lower electrodes forms the plasma, and the potential between the inner and outer electrodes accelerates ions towards the inner electrode.

The fill gas can be any gas capable of ionization by the device. For a fusion reaction of the same element, elements up to the molecular weight of iron can be supplied to the apparatus via the fill gas. Additionally, other nuclear reactions, for example, nuclear reactions between a mixture of an ionizable gas and another gas can be promoted by the apparatus. For example, deuterium could be accelerated and impacted with helium-3, or a proton impacted with boron-11.

Any ion capable of being accelerated by an electrical potential can be used in the IECF apparatus. In addition to fusion, the device is capable of promoting reactions that can result from accelerated ion collisions. These reactions include fission, other nuclear reactions, and molecular alterations. It should be appreciated that the fill gas is not limited to elemental gasses, and molecular gases could also be subjected to a nuclear reaction.

Additionally, it should be understood that while the source of ions can be an in situ generation of ions from a supplied fill gas, ions could be injected into the space between the electrodes by such sources as a particle beam generator, an ion gun or other molecular or charged particle beam sources. Also, a combination of ions formed in situ and supplied ions could be used to create reactions.

One should appreciate that the outer electrode can be formed of any conductive material, with stainless steel being the preferred material. It should further be appreciated that while the outer electrode can be a dedicated electrode structure, the outer electrode can also be the walls of the vacuum chamber.

The size, shape, and geometry of the inner electrode can be manipulated to produce a desired plasma shape. For example, the conductive wire within the insulator stalk 40 may be formed with a flat end-face flush with the end face of the insulator stalk, or the conductive wire may be recessed into the insulator stalk 40. Also, the conductive wire may have a flat end-face, curved end-face, or could be formed into a point, either flush with the end of the stalk or recessed into the stalk.

Referring again to FIG. 2, the IECF apparatus is operated by forming a vacuum in the vacuum chamber (not shown) by a vacuum system 120 that may include an in-series combination of a two-stage vacuum pump and a diffusion vacuum pump as is known in the art. As shown in FIG. 3, top electrode 90 and bottom electrode 100 are wire electrodes that slightly protrude from the stalk insulators 40. The wire electrodes are connected to a high voltage from a high voltage supply 130. In this embodiment, the wire electrodes slightly protruded from the end of the stalks 40. It should be understood that other electrode geometries are possible, including where the electrode is flush with the end of the stalk and where the electrode is slightly recessed into the stalk. Forming the electrode with the wire flush with the end of the stalk could assist in the dissipation of heat generated at the wire by the mass of the insulator, and recessing the wire could assist in shaping the plasma.

The following example is provided as a non-limiting embodiment of the present invention. An experiment was conducted with a separation of approximately 0.25 inches between the top electrode 90 and bottom electrode 100. A vacuum chamber was filled with deuterium and placed under an absolute vacuum of approximately 20 microns. A high voltage −25 KV potential was put on the top electrode 90 and an approximately −20 KV potential was put on the bottom electrode 100. This approximately 5 KV difference between the top electrode 90 and bottom electrode 100 caused a plasma of ionized deuterium to form in the gap 110 between the electrodes.

It should be understood that the aligned position of the upper electrode 90 and the lower electrode 100 within the outer electrode 30 is not important, and that the electrodes forming the discharge may be configured horizontally or at any other angle within the outer electrode 30. As shown in FIG. 2 and FIG. 3, the upper electrode 90 and the lower electrode 100 are approximately axially aligned and positioned approximately vertically within the outer electrode 30.

The outer electrode 30 is grounded, resulting in an approximate 22.5 KV potential formed between the plasma inner electrode in the approximate vicinity of the gap 110 and the outer electrode 30. The plasma acts just like a wire inner grid would since the plasma is at a high voltage potential relative to the outer grid.

Ions of deuterium in the space between the plasma and outer electrode 30 are accelerated towards the plasma. As can be seen in FIG. 3, this allows for collisions of ions as the ions approached the inner electrode from different points in space between the plasma and outer electrode 30.

Neutron output is an indication of fusion and was measured by a neutron detector 140 that was formed by a 22×1 inch Helium3 neutron detector tube inside a 6 inch diameter by 24 inch long paraffin moderator to thermalize the fast neutrons from deuterium-deuterium fusion. In this test, the neutron detector 140 was a Reuter-Stokes RS-P4-082C-103 detector. The detector tube was coupled to a Ludlum 2200 Scaler/Ratemeter by a shielded coax cable to measure the isotropic rate of neutron emission. An isotropic rate of approximately $10^4$ to $10^5$ neutrons/second was observed under the above conditions.

Through a camera viewport 72, as observed on a television monitor 73, the plasma glowed in the vicinity of the gap 110 in the visual light spectrum, and the upper stalk appeared incandescent because of heat generated by the power supplied to the electrode, creating an appearance of a "Pillar of Fire."

The removal of the wire grid inner electrode created an unobstructed path for accelerated ions towards the center of the apparatus. This increased the number of ions available for collision. Also, no grid structure became overheated from the impact of accelerated ions.

Several modifications are possible with the disclosed apparatus. For example, the arc generating the plasma could be focused to any desired profile using external magnets to create as narrow or diffuse arc as required. Additionally, it is possible to form the inner electrode by focusing radio frequency emissions at the center of the device to form an inner plasma electrode.

The invention may be applied in a variety of applications requiring ion acceleration and nuclear fusion reactions. Such applications include the study of fusion reactions, energy generation, vacuum and display tube technology, radioisotope production, medical therapy and nondestructive evaluation/neutron activation analysis.

Other embodiments of the invention will be apparent to those skilled in the art from consideration of the specification and practice of the invention disclosed herein. It is intended that the specification and examples be considered as exemplary only, with a scope and spirit of the invention being indicated by the following claims.

The invention claimed is:

1. An ion acceleration device, comprising:
   an inner electrode formed of a plasma;
   an outer electrode surrounding the inner plasma electrode;
   a vacuum chamber surrounding the inner electrode;
   a source for supplying ions between the inner plasma electrode and the outer electrode; and
   a means for creating a potential between the inner plasma electrode and the outer electrode to accelerate ions towards the inner plasma electrode;
   wherein the plasma is created by forming a high voltage potential between a first electrode and a second electrode positioned within the outer electrode or by focusing a radio frequency source within the vacuum.

2. The ion acceleration device of claim 1, wherein the inner electrode is formed by a high voltage potential created between a first electrode and a second electrode.

3. The ion acceleration device of claim 1, wherein the outer electrode forms at least part of the vacuum chamber.

4. The ion acceleration device of claim 1 wherein the source for supplying ions is a gas source which supplies a gas between the inner electrode and the outer electrode which is ionized in situ when the potential is created between the inner plasma electrode and the outer electrode.

5. The ion acceleration device as in either claim 1 wherein the inner electrode is formed by focusing a radio frequency emission on an ionizable gas.

6. The ion acceleration device of claim 1, wherein the source for supplying ions is an ion gun.

7. An inertial electrostatic confinement fusion device, comprising:
   an inner electrode formed of a plasma;
   an outer electrode surrounding the inner plasma electrode;
   a vacuum chamber surrounding the inner plasma electrode;
   a source for supplying ions into the vacuum chamber; and
   a means for creating a potential between the inner plasma electrode and the outer electrode to accelerate ions towards the inner plasma electrode;
   wherein the plasma is created by forming a high voltage potential between a first electrode and a second electrode positioned within the outer electrode or by focusing a radio frequency source within the vacuum.

8. The inertial electrostatic confinement fusion device of claim 7, wherein the inner plasma electrode is formed by a high voltage potential created between a first electrode and a second electrode.

9. The inertial electrostatic confinement fusion device of claim 7, wherein the outer electrode forms at least part of the vacuum chamber.

10. The inertial electrostatic confinement fusion device of claim 7, wherein the source for supplying ions is a gas source which supplies a gas between the inner electrode and the outer electrode which is ionized in situ when a potential is created between the inner plasma electrode and the outer electrode.

11. The inertial electrostatic confinement fusion device of claim 7, wherein inner electrode is formed by focusing a radio frequency emission on an ionizable gas.

12. The inertial electrostatic confinement fusion device of claim 7, wherein the gas source is a deuterium gas source.

13. The inertial electrostatic confinement fusion device of claim 7, wherein the source for supplying ions is an ion gun.

14. A method of accelerating ions comprising:
   forming a vacuum;
   creating a plasma within the vacuum;
   surrounding the plasma with an outer electrode;
   providing an ion source between the plasma and the outer electrode; and
   forming a potential between the plasma and the outer electrode to accelerate ions from the ion source towards the plasma;
   wherein the plasma is created by forming a high voltage potential between a first electrode and a second electrode positioned within the outer electrode or by focusing a radio frequency source within the vacuum.

15. A method of producing a nuclear reaction comprising:
   forming a vacuum;
   creating a plasma within the vacuum;
   surrounding the plasma with an outer electrode;
   forming a potential between the inner and outer electrodes; and providing ions that are effected by the potential between the inner and outer electrodes so as to accelerate the ions towards the inner electrode resulting in collisions of the ions with other particles creating a nuclear fusion reaction;
   wherein the plasma is created by forming a high voltage potential between a first electrode and a second electrode positioned within the outer electrode or by focusing a radio frequency source within the vacuum.

16. The method of claim 14, wherein the ions are provided by providing a supplied gas between the plasma and the outer electrode.

17. The method of claim 15, wherein the ions are provided by supplying a deuterium gas.

* * * * *